(12) United States Patent
Scharpf

(10) Patent No.: US 6,568,206 B2
(45) Date of Patent: May 27, 2003

(54) CRYOGENIC HYDROGEN AND CARBON MONOXIDE PRODUCTION WITH MEMBRANE PERMEATE EXPANDER

(75) Inventor: Eric William Scharpf, Port Chalmers (NZ)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/908,202

(22) Filed: Jul. 18, 2001

(65) Prior Publication Data
US 2003/0024388 A1 Feb. 6, 2003

(51) Int. Cl.[7] .............................................. F17C 3/00
(52) U.S. Cl. ............................ 62/624; 62/920; 62/931
(58) Field of Search .......................... 62/624, 920, 931

(56) References Cited

U.S. PATENT DOCUMENTS

| | | | |
|---|---|---|---|
| 4,548,618 A | | 10/1985 | Linde et al. .................... 55/16 |
| 4,654,063 A | | 3/1987 | Auvil et al. .................... 62/18 |
| 4,687,498 A | * | 8/1987 | Maclean et al. ............... 62/624 |
| 5,053,067 A | * | 10/1991 | Chretien ....................... 62/624 |
| 5,233,837 A | * | 8/1993 | Callahan ....................... 62/624 |
| 5,351,491 A | | 10/1994 | Fabian .......................... 62/18 |
| 5,634,354 A | * | 6/1997 | Howard et al. ................ 62/624 |
| 6,161,397 A | | 12/2000 | McNeil et al. ................. 62/624 |

FOREIGN PATENT DOCUMENTS

| | | | |
|---|---|---|---|
| DE | 4210638 | 3/1993 | ......... C01B/003/50 |
| EP | 0239235 | 9/1987 | ........... C01B/23/00 |
| EP | 0359629 | 9/1989 | ........... B01D/53/22 |
| EP | 0968959 | 1/2000 | ............. C01B/3/50 |
| FR | 2636543 | 3/1990 | ......... B01D/005/00 |
| GB | 1416163 | 12/1975 | ............. F25J/3/04 |
| JP | 63247582 | 10/1988 | ............. F25J/3/08 |
| WO | WO99/67587 | 12/1999 | ............. F25K/1/00 |

* cited by examiner

*Primary Examiner*—Ronald Capossela
(74) *Attorney, Agent, or Firm*—Geoffrey L. Chase

(57) ABSTRACT

A process for recovering a first component and/or a second component from a multicomponent feed gas mixture containing the first component and the second component includes multiple steps. The first step is to pass the feed gas mixture through a membrane separation unit, thereby separating the feed gas mixture into a first stream enriched in the first component and a second stream lean in the first component. The second step is to cool the first stream. The third step is to expand the cooled first stream in a work extraction device, thereby generating a refrigeration supply for the process.

12 Claims, 2 Drawing Sheets

CRYOGENIC HYDROGEN AND CARBON MONOXIDE PRODUCTION WITH MEMBRANE PERMEATE EXPANDER

BACKGROUND OF THE INVENTION

The present invention pertains to cryogenic processes for recovering hydrogen and/or carbon monoxide from gas mixtures containing those and possibly other components, and in particular to such cryogenic processes which use hydrogen rejection membranes.

Syngas is a gaseous mixture consisting primarily of hydrogen ($H_2$) and carbon monoxide (CO) which, depending upon the level of purity, may contain relatively small amounts of argon, nitrogen, methane and other trace hydrocarbon impurities. The primary uses of syngas are in the synthesis of methanol (requiring a hydrogen:carbon monoxide molar ratio of 2:1) and in reactions to produce oxo-alcohols (requiring a hydrogen:carbon monoxide molar ratio of at least 1:1). For many applications, it is necessary to control the relative proportions of hydrogen and carbon monoxide. This is achieved by, for example, cryogenically separating crude syngas into separate hydrogen-rich and carbon monoxide-rich streams and then combining those streams in the appropriate molar ratio to produce the required syngas composition. In addition to various syngas ratio adjustment applications, it is often desirable to extract and purify significant quantities of carbon monoxide and/or hydrogen from similar crude syngas feed streams. These carbon monoxide and/or hydrogen production processes can also be achieved through cryogenically separating the crude syngas into separate hydrogen-rich and carbon monoxide-rich streams before further purification and/or blending as appropriate. The level of impurities, especially methane and other hydrocarbons, in the crude syngas usually also is reduced during the cryogenic separation.

Existing technologies for the cryogenic processes that recover hydrogen and carbon monoxide use various methods of refrigeration that are relatively expensive and inefficient. Many of the difficulties with the existing technologies relate to the inherent nature of those methods of refrigeration. There are two main methods for providing refrigeration for processes with lower levels of $H_2$ production when an external refrigerant is not available. The first method is to partially condense the $H_2$—CO syngas feed and turbo-expand all or part of the $H_2$-rich fraction that is not condensed from the syngas feed. This is often inefficient because of the large amount of refrigeration required to partially condense the feed stream when it contains significant quantities of $H_2$. The second method is to use a membrane system to reject the excess $H_2$ upstream of the cryogenic system and rely on the Joule-Thompson (J-T) refrigeration resulting from the lower pressure flashing of the cold feed stream. Although there are numerous variations on this method, the refrigeration from the feed stream J-T expansion is not always sufficient to operate the overall system.

There are several existing membrane integration schemes for cryogenic process cycles to produce carbon monoxide, hydrogen, and/or syngas. All of these processes have several features in common. All of the processes typically start with a crude syngas feed stream containing primarily hydrogen and carbon monoxide with lower levels of $N_2$, Ar, $CH_4$, and other trace hydrocarbon impurities. The syngas feed stream typically is passed over a semi-permeable membrane to remove varying levels of excess $H_2$ while the $H_2$-rich permeate typically is blended with fuel or taken as product at this point. The CO-enriched retentate stream typically is then cooled and partially condensed to partially separate most of the heavier components from the hydrogen. Any non-condensed remaining $H_2$-rich stream may be washed with a condensed fluid, such as CH4, to remove further impurities in what commonly are known as $CH_4$-wash cycles. In these wash cycles, the process refrigeration is most commonly provided by a pure carbon monoxide recycle system integrated with a carbon monoxide product compressor. In cycles without the wash step, commonly referred to as partial condensation cycles, the $H_2$-rich stream is commonly expanded in a turbo-expander for refrigeration before it leaves the cryogenic part of the plant as a crude hydrogen product. This second crude hydrogen product is often further purified by pressure swing adsorption (PSA) and is sometimes compressed to final delivery pressure.

The remaining heavier liquid is then separated in one or more columns to remove the residual hydrogen, $CH_4$, and optionally any other relevant impurities. The purified carbon monoxide is then rewarmed and typically leaves the cryogenic part of the plant as low pressure carbon monoxide product. This carbon monoxide stream is often compressed to final delivery pressure with part of the carbon monoxide stream sometimes compressed and returned to the cryogenic system to provide column reflux or as a heat pumping fluid.

There are numerous examples of this general purification scheme with various different methods of membrane integration disclosed in the patent literature. Some of these examples are discussed below.

U.S. Pat. No. 4,548,618 (Linde, et al.) discloses a membrane and cryogenic process integration for $H_2$ removal and purification of light gases with a normal boiling point of less than 120° K. Here, $H_2$ is removed from the feed to the cryogenic system by the membrane. The $H_2$-lean stream is then fed to the cyogenic system and is itself expanded to provide refrigeration for the process. The $H_2$-rich permeate stream does not even enter the cyogenic system and is discharged as byproduct.

U.S. Pat. No. 4,654,063 (Auvil, et al.) discloses integration of a membrane system with a non-membrane separation system (specifically including the case of a cryogenic system) to recover $H_2$ from a feed gas mixture. Here, the membrane is used to remove $H_2$ from the feed to the non-membrane separator and/or to take an $H_2$-enriched stream from the non-membrane separator unit and remove $H_2$ before recycling the subsequent $H_2$-lean stream to the non-membrane separator. The $H_2$-rich permeate streams in all of the embodiments are subsequently discharged as a product stream with optional compression.

EP 0359 629 (Gauthier, et al.) discloses generation of a $H_2$/CO syngas from a feed with excess $H_2$. This feed is passed through a permeator to adjust the $H_2$/CO ratio by removing some $H_2$ before at least a portion of the adjusted syngas is subsequently fed to a cryogenic system for the production of $H_2$ and CO. The $H_2$-rich permeate stream is directly discharged from the membrane as a byproduct.

JP 63-247582 (Tomisaka) discloses a process to separate CO from a predominantly CO and $H_2$ feed which is passed to a membrane system immediately upstream of a cryogenic system to raise the concentration of CO in the gas fed to the cryogenic system. Here the refrigeration for the process is provided by a combination of J-T refrigeration from the feed stream and a supplemental liquid nitrogen (LIN) stream. The $H_2$-rich permeate from the membrane is used for regeneration of adsorption based $CO_2$ and $H_2O$ removal beds.

DE 43 25 513 (Fabian) describes a process for recovery of a high purity CO product stream and a $H_2$ product stream using a membrane integrated with a cryogenic partial condensation cycle. An intermediate syngas stream is passed through a membrane to remove $H_2$ before the stream is recycled to the cryogenic system to recover and purify the CO product. The $H_2$-rich permeate is then discharged from the process as $H_2$ product. The claimed benefit relative to a condensation cycle without a membrane is the elimination of the cold heat exchanger and $H_2$ expansion refrigeration system. Fabian's work is clearly focused on situations where there is sufficient J-T refrigeration in the feed stream to completely drive the overall separation process.

EP 0 968 959 (Billy) also discloses an integrated membrane and cryogenic process. Here the membrane rejects $H_2$ from a $CO/H_2$ stream produced at cryogenic conditions. The $H_2$-depleted non-permeate stream is compressed and recycled back to the cryogenic system feed stream. The $H_2$-rich permeate stream is not returned to the cryogenic process and is discharged as a byproduct. Refrigeration for the process is provided by expanding a separate $H_2$-rich stream generated independently within the cryogenic system.

WO 99 67587 (O'Brien) discloses a membrane-enhanced cryogenic process for the production of a specific $H_2/CO$ ratio syngas stream. The membrane rejects a $H_2$-rich permeate steam while the $H_2$-depleted non-permeate stream is fed to the cryogenic system. The refrigeration for the process is provided by expanding a portion of the bottoms stream from a $CH_4$ removal column. The $H_2$-rich permeate stream is compressed and discharged from the system as a byproduct without entering the cryogenic portion of the system.

U.S. Pat. No. 6,161,397 (McNeil, et al.) also discloses an integrated membrane and cryogenic process. Here the cryogenic system produces multiple syngas streams and the membrane is part of a flow and $H_2/CO$ ratio control scheme. The $H_2$-rich permeate stream is sent directly to fuel while the refrigeration for the process is provided by supplemental LIN.

It is desired to have a process which reduces the costs and improves the efficiency of a cryogenic condensation cycle hydrogen-carbon monoxide system producing carbon monoxide and optionally hydrogen and/or syngas co-products.

It is further desired to have a process for the production of hydrogen and carbon monoxide which overcomes the disadvantages and deficiencies of the prior art to provide better and more advantageous results.

BRIEF SUMMARY OF THE INVENTION

The invention is a process and a system for recovering a first component and/or a second component from a multi-component feed gas mixture containing the first component and the second component. There are several embodiments and variations of the process and the system.

A first embodiment of the process includes multiple steps. The first step is to pass the feed gas mixture through a membrane separation unit, thereby separating the feed gas mixture into a first stream enriched in the first component and a second stream lean in the first component. The second step is to cool the first stream. The third step is to expand the cooled first stream in a work extraction device, thereby generating a refrigeration supply for the process.

In a preferred embodiment, the first component is hydrogen and the second component is carbon monoxide. However, the process may be used for recovering one or more components from multicomponent feed gas mixtures containing components other than hydrogen and/or carbon monoxide.

There are several variations of the first embodiment of the process. In one variation, the membrane separation unit is a semi-permeable membrane adapted to reject the first component. In another variation, the work extraction device is a turbo-expander.

In another variation of the first embodiment of the process, the first stream is cooled by feeding the first stream to a heat exchanger. There are several variants of this variation. In one variant, the process includes the further step of withdrawing from the heat exchanger a product stream of the first component. In another variant, the process includes an additional step of feeding the second stream to the heat exchanger. In yet another variant, the process includes the additional step of withdrawing from the heat exchanger a product stream of the second component.

A first embodiment of the system includes four elements. The first element is a membrane separation unit. The second element is a means for passing the feed gas mixture through the membrane separation unit, thereby separating the feed gas mixture into a first stream enriched in the first component and a second stream lean in the first component. The third element is a means for cooling the first stream. The fourth element is a work extraction device adapted to expand the cooled first stream, thereby generating a refrigeration supply for the system.

In a preferred embodiment of the system, the first component is hydrogen and the second component is carbon monoxide. However, the system may be used for recovering one or more components from multicomponent feed gas mixtures containing components other than hydrogen and/or carbon monoxide.

There are several variations of the first embodiment of the system. In one variation, the membrane separation unit is a semi-permeable membrane adapted to reject the first component. In another variation, the means for cooling is a heat exchanger. In yet another variation, the work extraction device is a turbo-expander.

A second embodiment of the system is similar to the first embodiment, but includes an additional element. The additional element is at least one distillation column adapted to receive at least a portion of the second stream.

BRIEF DESCRIPTION OF SEVERAL VIEWS OF THE DRAWINGS

The invention will be described by way of example with reference to the accompanying drawings, in which.

DETAILED DESCRIPTION OF THE INVENTION

The invention relates to a cryogenic partial condensation cycle to produce purified carbon monoxide and optionally hydrogen and/or syngas product streams from a feed containing primarily hydrogen, carbon monoxide, and methane, with trace levels of nitrogen and argon. Any water, carbon dioxide, or other freezable components are removed further upstream in the overall process.

The invention takes advantage of the high partial pressure of $H_2$ in the feed to most existing cryogenic carbon monoxide purification cycles so as to improve process efficiency. It does this by employing a $H_2$ rejection membrane on the syngas feed stream with a relatively high $H_2$ back pressure, preferably about 100 psig. The resulting $H_2$-rich permeate is thus available at this moderately high pressure and can then be fed as a separate stream to the cyrogenic part of the plant, cooled to cyrogenic conditions, and expanded in a turbo-expander to generate the process refrigeration before it is rewarmed and rejected as fuel or low pressure $H_2$ product.

Figure 1:
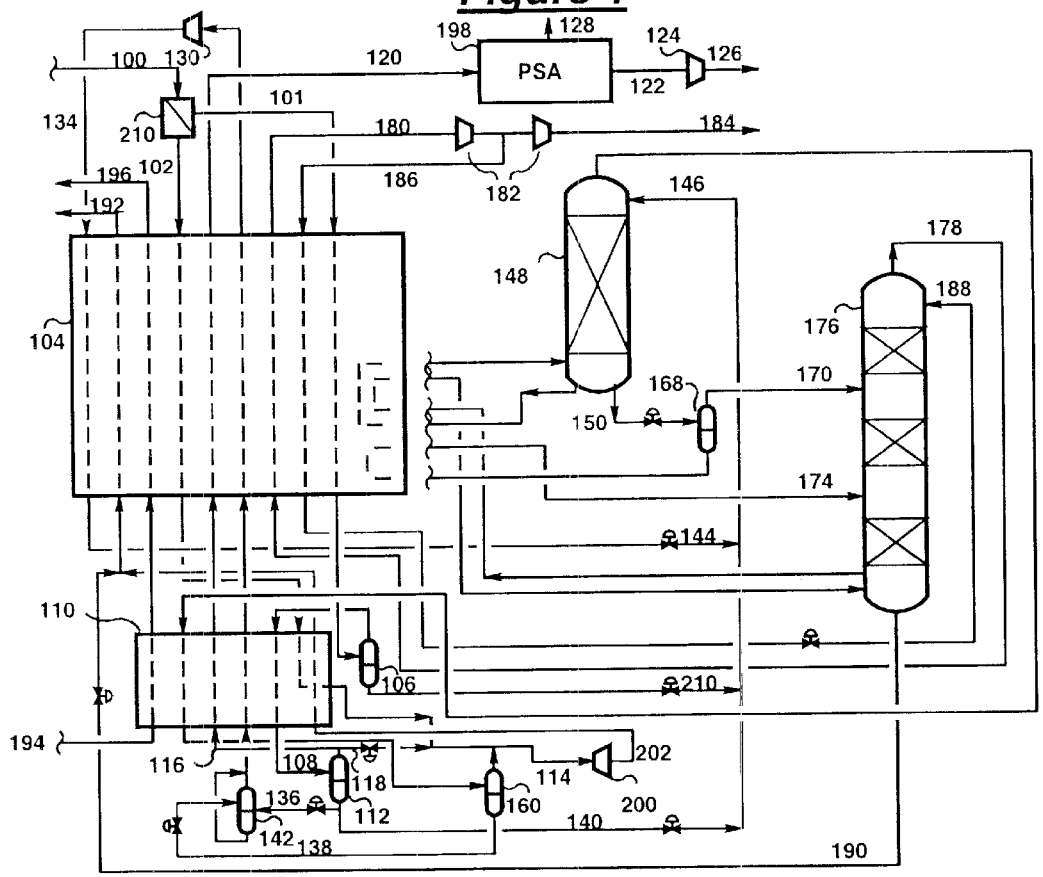
FIG. 1 is a schematic diagram illustrating one embodiment of the present invention.

FIG. 1 shows a preferred embodiment of the invention comprising turbo expansion of a $H_2$-rich stream 114 derived from a combination of $H_2$-rich streams including the cooled $H_2$-rich permeate. In this embodiment, unlike in the prior art, both a $H_2$-rich permeate stream and a $H_2$-depleted non-permeate stream are fed to the cryogenic plant.

The preferred embodiment discussed below and shown in FIG. 1 is primarily for illustration of the preferred application of the invention. It is not meant to limit the invention to this particular configuration of a partial condensation cycle for carbon monoxide and/or hydrogen purification.

Referring to FIG. 1, syngas feed stream 100 is fed to a semi-permeable $H_2$-rejection membrane 210. Although not shown, the feed stream optionally can be combined with other $H_2$-containing streams or recycle streams from other parts of the overall process within the scope of the present invention.

The $H_2$-rich permeate stream 102 is fed to a first heat exchanger 104, where it is cooled and is then fed to a second heat exchanger 110. These heat exchangers may include one or several separate units depending on the particular application. After leaving the second heat exchanger 110, the cold $H_2$-rich permeate stream optionally is then blended with other $H_2$-rich streams to form $H_2$-rich stream 114, which is fed to a work extraction device 200 and expanded to form stream 202. This work extraction device preferably is a turbo-expander unit, but other comparable work extraction devices are equally viable.

The $H_2$-depleted non-permeate stream 101 also is fed to the first heat exchanger 104. As with the syngas feed stream 100, stream 101 may be combined with other $H_2$-depleted streams or recycle streams from other parts of the overall process within the scope of the present invention. Stream 101 is cooled and partially condensed in the first heat exchanger 104, and is then separated into vapor and liquid components in a first vessel 106. The CO-rich liquid bottoms fraction is let down in pressure and is fed as stream 210, along with other streams, as reflux 146 to a hydrogen removal column 148. The $H_2$-rich vapor overheads fraction is further cooled and partially condensed in the second heat exchanger 110 to form stream 108.

This colder, partially condensed overheads stream 108 is fed to a second vessel 112 from which a second CO-rich liquid bottoms fraction and a second $H_2$-rich vapor overheads fraction are withdrawn. Part of this second H2-rich vapor overheads fraction, stream 118, optionally is let down in pressure and blended with other $H_2$-rich streams to form $H_2$-rich stream 114, which is fed to the work extraction device 200 and expanded to form stream 202. Optionally, any remainder of the second $H_2$-rich vapor overheads fraction, substream 116, is rewarmed in the second heat exchanger 110 and in the first heat exchanger 104, and is then fed as stream 120 to a hydrogen purification unit 198, such as a pressure swing adsorption (PSA) unit, to produce a purified hydrogen stream 122. This stream optionally is then compressed to final delivery pressure in a first compressor 124 and sent to the end user as stream 126. The offgas stream 128 from the hydrogen purification unit 198 may either be discharged as a byproduct or be combined with other streams and compressed in a second compressor 130 before being recycled to the cryogenic plant as stream 134 or blended into the syngas feed stream 100 to improve carbon monoxide recovery.

The CO-rich liquid bottoms fraction from the second vessel 112 is split into two substreams, 136 and 140. Substream 136 is let down in pressure and fed to a low pressure vessel 142. Substream 140 is let down in pressure and is fed, along with other streams, as reflux 146 to the hydrogen removal column 148. Both the liquid and vapor in low pressure vessel 142 are combined and rewarmed in the second and first heat exchangers (110 and 104) before being fed to the second compressor 130 to become at least part of the recycled syngas stream 134.

The hydrogen removal column 148 removes the remaining low levels of hydrogen from the various CO-rich streams fed to the column to produce a $H_2$-depleted, CO-rich stream 150. The $H_2$-rich column overheads are cooled and partially condensed in the second heat exchanger 110 before being fed to a vapor-liquid separator 160. The CO-rich liquid from the bottom of the vapor-liquid separator 160 is let down in pressure and fed to the low-pressure vessel 142 as stream 138 along with the other CO-rich streams, such as substream 136. The relatively $H_2$-rich overheads from the vapor-liquid separator 160 optionally are combined with $H_2$-rich stream 118 and the cooled $H_2$-rich permeate stream 102 before being fed as combined $H_2$-rich stream 114 to the work extraction device 200.

All of these other $H_2$-rich streams blended with the $H_2$-rich permeate stream 102 are not critical to the invention but rather constitute additional aspects of the preferred embodiment as shown in FIG. 1.

CO-rich stream 150 is further processed in the downstream part of the plant to remove additional light and heavy impurities preferably, but not restrictively, by distillation. In the preferred embodiment, these impurities are primarily $CH_4$, but would be expected to include (but are not limited to) $N_2$ and Ar. In the example shown, CO-rich stream 150 is let down in pressure into the vapor liquid separator 168. The resultant vapor fraction 170 is fed to column 176. The resultant liquid fraction is at least partially vaporized in the first heat exchanger 104 and then fed to column 176 as stream 174.

Column 176 typically removes $CH_4$ and any other heavy impurities from the carbon monoxide. These heavies are withdrawn from the bottom of the column as stream 190 and rewarmed in the first heat exchanger 104 before leaving the plant as stream 192. The overhead purified carbon monoxide stream 178 is rewarmed in the first heat exchanger 104 and compressed in a third compressor 182. A substream 186 of this CO stream is withdrawn from the third compressor, cooled and condensed in the first heat exchanger 104, and acts as reflux 188 for column 176. Optionally, the remaining CO is further compressed to leave the plant as carbon monoxide product stream 184.

In certain options of this embodiment, a separate lights (e.g., nitrogen) removal column may be added either immediately upstream or downstream of column 176. In the case where it is upstream, the CO-rich stream 150 would be fed preferentially to the lights removal column with a lights depleted vapor stream then fed as a single feed stream to the heavies removal column 176.

In cases where the work extraction device 200 is temporarily inoperative, an additional back-up stream of liquid nitrogen or other suitable refrigerant optionally can be provided as stream 194 into the cold end of the plant. The spent auxiliary refrigerant would then exit the plant after it is warmed and/or vaporized in the first and second heat exchangers (104 and 110) as stream 196.

Since this invention is focused on cases where long-term supply of auxiliary refrigeration is not viable and where insufficient J-T refrigeration from the syngas feed to the cryogenic system is present, the most appropriate comparison of the invention with existing technology is against a traditional $H_2$ expander cycle.

Figure 2:
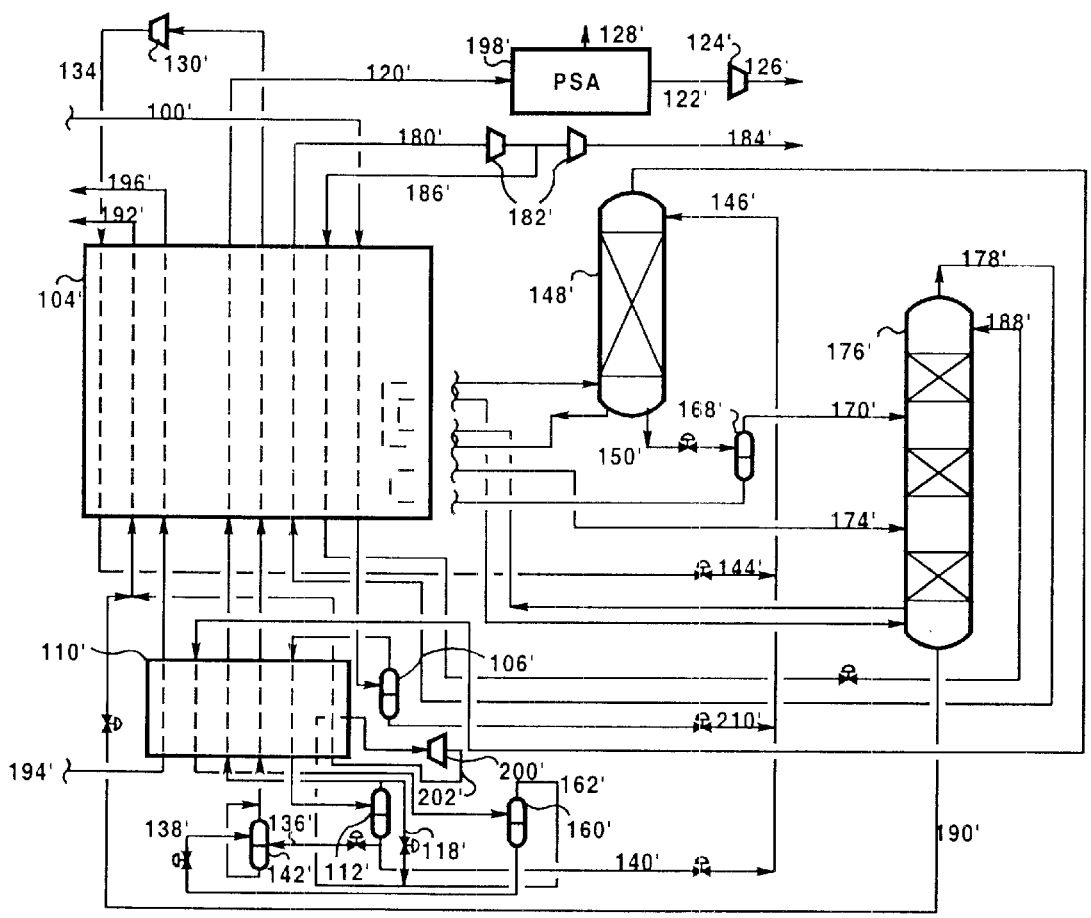
FIG. 2 is a schematic diagram illustrating a prior art process.

An example of the base case existing technology with a traditional $H_2$-rich turbo-expansion refrigeration system is shown in FIG. 2. All references for similar streams and equipment items to those described in the preferred embodiment (FIG. 1) are designated by the same reference number but containing a single prime character (') immediately after the reference number. Note that not all specific elements are separately addressed with respect to FIG. 2.

Overall, the purification aspects are essentially the same as for the first embodiment, except that the $H_2$-rich stream for turbo-expansion is generated primarily from stream 118'. No semi-permeable membrane is present and thus no $H_2$-rich permeate stream for turbo-expansion is present either.

Based on a computer simulation, both of the invention and of the base case existing technology, the invention shows a number of benefits over the existing technology, as discussed below. These benefits are evaluated at the nominal process conditions shown in Table 1 and are summarized in Table 2.

The primary benefit of the invention is that the membrane increases the partial pressure of CO in the syngas feed so that more J-T refrigeration is available to the process without the sacrifice of any appreciable $H_2$-rich expander generated refrigeration.

One way this benefit is evident is that the invention is able to achieve a lower minimum feed condensation temperature of $-328°$ F., as compared to $-323°$ F. for the base case existing technology. This is the direct result of the increased J-T refrigeration available from the $H_2$-depleted syngas feed to the cryogenic system. The consequence of this lower feed condensation temperature is that less CO is lost or required to be recycled from the high pressure $H_2$-rich discharge stream. The base case existing technology CO level in this stream is 3.4 mole %, while it is only 2.5 mole % for the invention. This improvement translates into an overall CO recovery increase from 92.7% for the base case existing technology to 93.5% for the present invention.

Another way that this benefit is evident is in the higher pressure of the heavies removal column. The base case existing technology has a pressure of 57 psia while the present invention has a pressure of 86 psia. This higher pressure comes from the reduced heat pumping requirements for the process resulting from the improved refrigeration. This higher pressure allows the CO product compression to be significantly reduced from 870 hp down to 560 hp.

The increased available refrigeration also is able to reduce the syngas recycle compression requirement. The base case existing technology requires 450 hp, while the invention only requires 300 hp.

Finally, the invention allows the fuel stream to be withdrawn from the process at a higher pressure, 64 psia vs 40 psia for the existing technology base case. This improves the flexibility of the plant to operate in situations where the fuel delivery pressure must be higher.

All of these benefits require a relatively small additional cost of an $H_2$ rejection membrane relative to the existing technology base case. But, because the magnitude of the benefits is so great, the benefits easily outweigh the additional cost.

TABLE 1

NOMINAL PROCESS CONDITIONS

| | |
|---|---|
| Feed Pressure (psia) | 508 |
| $H_2$/CO | 1.80 |
| $N_2$ + Ar Level (%) | 0 |
| $CH_4$ Level (%) | 0.3 |
| Temp (F.) | 104 |
| Total Feed Flow ($Nm^3$/hr) | 28,000 |
| Nominal CO Product Flow $Nm^3$/hr | 10,000 |
| Pressure (psia) | 150 |
| $CH_4$ Level (ppm) | 5 |
| $H_2$ Level (ppm) | 50 |
| Nominal HP $H_2$ Product Flow ($Nm^3$/hr) | 5,000 |
| Pressure (psia) | Pfeed-dP process |
| Fuel Pressure (psia) | >20 |
| Compressor Cooler Temp (F.) | 100 |

TABLE 2

PERMEATE EXPANDER PERFORMANCE COMPARISON

| CYCLE | Permeate Expander | Base Case H2 Expander |
|---|---|---|
| Reference | FIG. 1 | FIG. 2 |
| Syngas compressor power hp | 300 | 450 |
| CO compressor power hp | 560 | 870 |
| Total power hp | 860 | 1320 |
| Heavies removal column pressure psia | 86 | 57 |
| $H_2$ column pressure psia | 186 | 117 |
| HP $H_2$ by product pressure psia | 466 | 476 |
| Minimum feed condensation temp. F. | −328 | −323 |
| CO in $H_2$ by product % | 2.5 | 3.4 |
| Expander power hp | 105 | 110 |
| Expander inlet pressure psia | 167 | 109 |
| Expander discharge pressure psia | 73 | 47 |

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A process for recovering a first component and/or a second component from a multicomponent feed gas mixture containing the first component and the second component, comprising the steps of:

passing the multicomponent feed gas mixture through a membrane separation unit, thereby separating said multicomponent feed gas mixture into a first stream enriched in said first component and a second stream lean in said first component;

cooling said first stream by heat exchanging the first stream in a heat exchanger with a third stream, whereby said third stream is warmed; and expanding the cooled first stream in a work extraction device, thereby generating said third stream, the third stream being cooler than said first stream.

2. A process as in claim 1, wherein said work extraction device is a turbo-expander.

3. A process as in claim 1, comprising the further step of withdrawing from said heat exchanger a product stream of said first component.

4. A process as in claim 1, comprising the further step of feeding said second stream to said heat exchanger.

5. A process as in claim 4, comprising the further step of withdrawing from said heat exchanger a product stream of said second component.

6. A process as in claim 1, wherein said membrane separation unit is a semi-permeable membrane adapted to reject said first component.

7. A process as in claim 1, wherein said first component is hydrogen and said second component is carbon monoxide.

8. A system for recovering a first component and/or a second component from a multicomponent feed gas mixture containing the first component and the second component, comprising:

a membrane separation unit;

means for passing said multicomponent feed gas mixture through said membrane separation unit, thereby separating said multicomponent feed gas mixture into a first stream enriched in said first component and a second stream lean in said first component;

a heat exchanger for cooling said first stream by heat exchanging the first stream with a third stream in said heat exchanger, whereby said third stream is warmed; and a work extraction device adapted to expand the cooled first stream, thereby generating said third stream, the third stream being cooler than said first stream.

9. A system as in claim 8, wherein said work extraction device is a turbo-expander.

10. A system as in claim 8, further comprising:

at least one distillation column adapted to receive at least a portion of said second stream; and means for transmitting the at least a portion of the second stream from said membrane separation unit to said at least one distillation column.

11. A system as in claim 8, wherein said membrane separation unit is a semi-permeable membrane adapted to reject said first component.

12. A system as in claim 8, wherein said first component is hydrogen and said second component is carbon monoxide.

* * * * *